United States Patent [19]

Fox et al.

[11] Patent Number: 4,776,155

[45] Date of Patent: Oct. 11, 1988

[54] REEL FOR A HARVESTING MACHINE

[75] Inventors: Thomas R. Fox, Winnipeg; Douglas K. Rogalsky, Domain, both of Canada

[73] Assignee: MacDon Industries Ltd., Winnipeg, Canada

[21] Appl. No.: 788,335

[22] Filed: Oct. 17, 1985

[51] Int. Cl.$^4$ .............................................. A01P 57/02
[52] U.S. Cl. ....................................... 56/220; 56/227; 403/282; 29/526 R; 29/455 R
[58] Field of Search ................. 56/227, 226, 220, 219, 56/DIG. 20, 400.21, 400, 14.4, 14.3; 403/279, 282, 109; 29/526, 455, 508, 515, 516, 514, 517, 518

[56] References Cited

U.S. PATENT DOCUMENTS

| | | |
|---|---|---|
| 2,748,556 | 6/1956 | Summers et al. ...................... 56/400 |
| 2,840,975 | 7/1958 | Koller .................... 56/219 |
| 3,158,976 | 12/1964 | Scheidenhelm ....................... 56/220 |
| 3,468,109 | 9/1969 | Reimer ..................... 56/220 |
| 3,572,778 | 3/1971 | Cassel ..................... 29/526 |
| 3,626,678 | 12/1971 | Quam ..................... 56/400 |
| 4,472,928 | 9/1984 | Easton ..................... 56/220 |

Primary Examiner—John J. Wilson
Assistant Examiner—John Weiss
Attorney, Agent, or Firm—Adrian D. Battison

[57] ABSTRACT

A reel for a harvesting machine comprises a plurality of bats arranged for rotation around an axis defined by a shaft. The bats are pivotal about a bat axis parallel to the shaft and are driven in pivoting movement by an eccentric ring member interconnected to each of the bats by a rigid link controlled by the eccentric ring member. The ring member is free to rotate relative to the shaft but is driven by each in turn of the links when the respective bat reaches an extreme position as defined by a sliding link coupled between the rigid link and the ring member. The bats comprise folded sheet metal in tubular form defining a plurality of pockets each for receiving a plastics finger for projecting from a leading edge of the bat. Each bat is formed from separate bat portions coupled together by tubes extending into an end of the bat and bolted to the tubes so as to depress material from the bat into a punched hole formed in a groove in the tube.

13 Claims, 3 Drawing Sheets

REEL FOR A HARVESTING MACHINE

BACKGROUND OF THE INVENTION

This invention relates to a reel for a harvesting machine of the type which comprises a shaft and a plurality of bats mounted around the shaft for rotation on the shaft to feed crop past a cutter knife onto the harvester table. A reel of this type mounts the bats for pivotal movement about a bat axis spaced from the shaft with each bat including a plurality of fingers which extend forwardly from a leading edge of the bat for engaging into the crop and guiding it onto the table. The bats are pivoted about the bat axis by a cam control system so that the fingers adjust in angle relative to a radial plane passing through the bat as the bat moves around from an initial position in which it enters the crop to a completed position in which it is retracted from the crop as the crop drops onto the table.

An initial problem relating to the above type of reel concerns the driving of the cam control system which operates the position of the bats around the reel axis. U.S. Pat. No. 4,067,177 (Tout) shows one example of a cam control system on a reel of this type. However, there remains a significant problem in providing drive to the cam which must rotate around the shaft offset from the shaft, with the cam being properly driven to control the fingers of the bats so they take up the desired position around the periphery of the reel.

SUMMARY OF THE INVENTION

According to a first aspect of the invention, therefore, there is provided a reel for a harvesting machine comprising a shaft, means mounting the shaft for rotation about a substantially horizontal reel axis, a plurality of bats, means mounting the bats relative to the shaft for common rotational movement around the reel axis and for individual pivotal movement of each of the bats about a respective bat pivot axis parallel to the reel axis, cam means for actuating said pivotal movement for each of said bats in controlled sequence around the reel axis, said cam means comprising a ring member, means mounting the ring member surrounding the shaft for rotation therearound about a cam axis offset from the reel axis, a plurality of rigid link members each pivotally connected to a respective bat at a position on the bat spaced from said bat pivot axis and to the ring member so as to actuate said pivotal movement, and means for limiting the amount of said pivotal movement whereby rotation of said bats around said shaft acts to drive said ring member through each in turn of said rigid link members.

In another important preferred feature, the sum of the length of the rigid link member and its distance from the cam axis is greater than the distance from the bat pivot axis to the reel axis so that preferably the pivot point on the ring member of the link member is advanced relative to a radius. This obtains an improved finger action.

A second problem which arises in relation to a reel of this type is that of forming the individual bats and fingers in a manner which can provide proper support for the fingers and at the same time make them readily replacable on damage of a particular finger without interfering with adjacent fingers. In addition, the bat structure must provide sufficient stability of the bat so that it can be self-supporting along its length without the requirement for stiffening struts.

According to a second aspect of the invention, therefore, there is provided a bat for a reel for a harvesting machine comprising a bat member formed from a folded sheet to define a hollow elongate body having along one elongate side a leading edge and along an opposing elongate side a trailing edge, said leading edge being shaped to define a plurality of separate openings facing forwardly from the leading edge, each opening having therein a plastics finger extending into the hollow interior and projecting forwardly therefrom, in between each opening and the next, the body being closed to provide structural strength therefor, said finger and body including cooperating latch means for retaining said finger therein.

It is one advantage of an arrangement of this type that the fingers can be manufactured as individual plastics fingers and can be individually inserted into the bat without interfering in any way with adjacent fingers. At the same time the insertion of the finger into a pocket defined in the bat enables the finger to be properly retained in the bat without danger of it breaking away or being simply removed by contact with crop or other materials in the field.

A third problem relating to a reel of this type concerns the manufacture of the bat in bat sections or members which are coupled together end to end to complete a full length of the bat and to pivot commonly about the bat axis. It is required to achieve this coupling that the weight of the bat itself be reduced to a minimum and that torque be properly communicated from one bat section to the next section through a coupling member.

According to a third aspect of the invention, therefore, there is provided a bat for a reel of a harvesting machine comprising a plurality of bat members each being elongate and formed from folded sheet metal material to define in cross section a support portion and a portion extending outwardly to one side thereof, and a plurality of connecting members each arranged to connect a bat member to the next adjacent bat member, each said connecting member including an elongate body extending into the interior of the support portion partly upon the length thereof, said body having a wall defining a cross section such that it is a sliding fit in the support portion with a portion of the exterior of the body wall in contact with the interior of the support portion, the wall having at least one countersunk hole therein for receiving a tapered surface of a screw threaded fastener passing radially through a hole in said support member and through the wall of the body so as to force a portion of the support member surrounding the hole into the countersunk hole in the wall of the body to clamp the support member to the body.

Preferably the body in the form of a tube is circular in cross section and cooperates with a semi-circular support portion so the support portion wraps around the tube and extends away from the tube to a leading edge of the bat. Two grooves can be provided in the tube in diametrically opposed arrangement for cooperation with the support portion at the ends of the semi-circular wall thereof. The grooves enable a bat section to be withdrawn from the tube with the distorted or compressed portion of the wall of the support member which has been depressed into the countersunk hole being able to run along the groove and drop off the end of the tube leaving the tube free for receiving a further bat section should one of the bat sections become damaged.

This technique for connecting a sheet metal folded elongate member to a coupling member can also be used in other environments and therefore, according to a fourth aspect of the invention, there is provided an interconnection for communicating torque from a connecting member to an elongate tubular sheet metal member, said sheet metal member defining in cross section a support portion and a portion extending outwardly to one side thereof, the connecting member including an elongate body extending into the interior of the support portion partly along the length thereof, said body having a wall defining a cross section such that it is a sliding fit in the support portion with a portion of the exterior of the wall in contact with the interior of the support portion, the wall having at least one countersunk hole therein for receiving a tapered surface of a screw threaded fastener passing radially through a hole in said support member and through the wall of the body so as to force a portion of the support member surrounding the hole into the countersunk hole to clamp the support member to the body.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred embodiment of the principles of the present invention, in which:

DESCRIPTION OF THE DRAWINGS

In the drawings like characters of reference indicate corresponding parts in the different figures.

DETAILED DESCRIPTION

Figure 1:
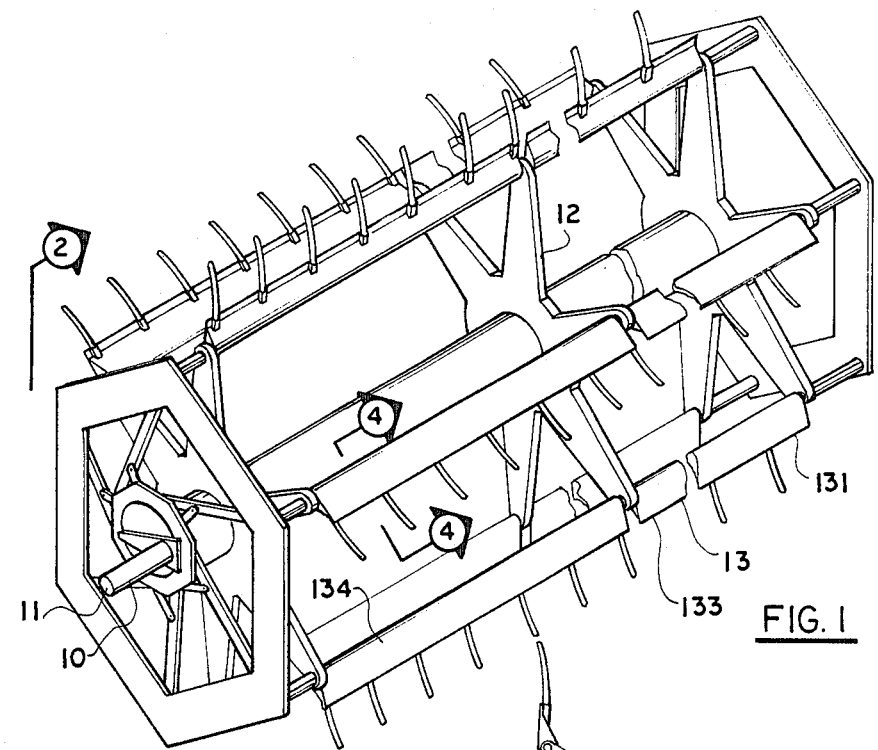
FIG. 1 is an isometric view of a reel according to the invention.

A reel for a harvester which can be a swather or a combine harvester includes a shaft 10 mounted on bearings 11 carried by a pair of reel arms (not shown). The remainder of the machine including the reel arms is or can be of a conventional form and therefore is not shown or described in detail herein.

The shaft 10 carries a plurality of outwardly extending arms 12 which support at their periphery a plurality of bats 13 for rotation with the arms and the shaft relative to the bearings 11.

The reel design may have five or six such bats and it will be appreciate that this number can be varied in accordance with design requirements.

Each bat comprises a plurality of bat sections 131, 132, 133, 134 each of which is supported at respective ends on a coupling and bearing arrangement attached to respective one of the arms 12. The bearing arrangement shown in more detail in FIG. 7 at 14 enables the bat to pivot about a bat axis parallel to the shaft 10 and passing through the end of the arm 12 so as to vary the angle of the bat relative to a radial plane passing through the respective arms 12.

The construction of the bat and its coupling members is shown in more detail in FIGS. 4, 5, 6 and 7. Specifically the bat is formed in substantially tubular form from a sheet of thin sheet metal material. The tubular form provides a support section 15 at a trailing edge of the bar, an outwardly extending section 16 at a forward end of the bat. The support section 15 is generally semi-circular in cross section and extends longitudinally along one edge of the bat. From that section, the bat has two walls 17 and 18 converging to the forward edge 16 at which a portion 19 of the wall 17 is wrapped around an edge 20 of the wall 18 to complete the tubular form. The edges 19 and 20 lie in the same plane as the wall 17 thus forming effectively a teardrop shape which diverges away from the leading edge for engaging a crop with a narrow leading edge which allows clean and gentle crop entry to keep shelling and stripping to a minimum. The semi-circular trailing edge provides a smooth edge which can assure smooth crop release as will be explained in more detail hereinafter.

Figure 4:
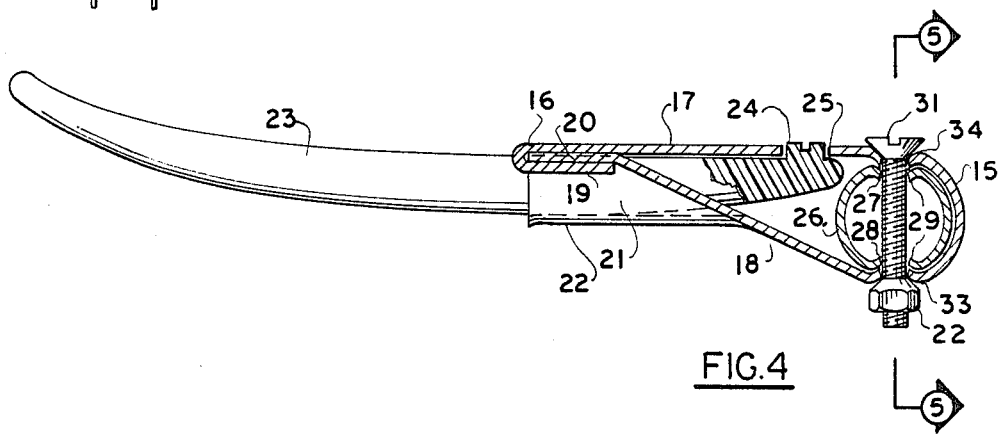
FIG. 4 is a cross sectional view along the lines 4—4 of FIG. 1 showing a single bat of the reel of FIG. 1.
Figure 6:
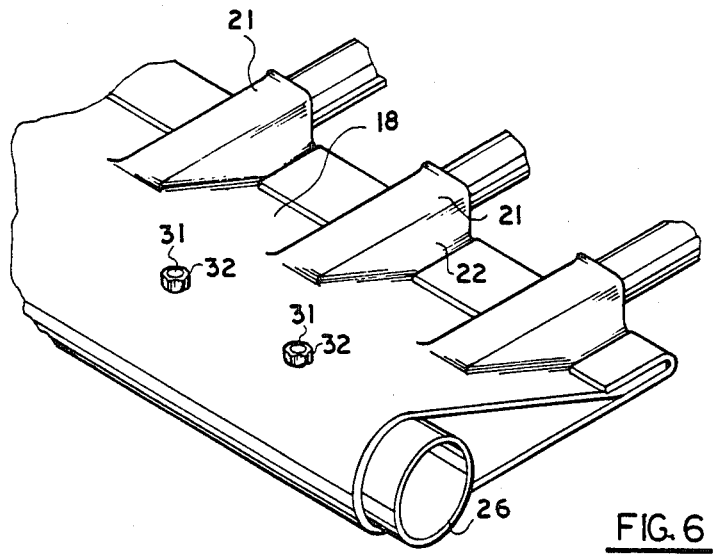
FIG. 6 is an isometric view of the bat of FIGS. 4 and 5 taken from an underside thereof.

The wall 18, as shown in cross section in FIG. 4 and in isometric view in FIG. 6 includes a plurality of pockets 21 which are formed by deformation of the wall 18 so that the pockets have an upper wall 22 which gradually moves further away from the wall 18 so as to lie substantially parallel to the wall 17 in the completed bat. The sides of the pocket 21 indicated at 22 are thus substantially triangular and generally upstanding from the wall 18. The pocket thus forms a substantially rectangular opening facing forwardly from the leading edge 16 for receiving a plastics finger 23 of a similar cross section. The finger 23 is molded from a suitable plastics material which is flexible and is tapered along its length so that it tends to bend constantly rather than at a particular point. To assist in avoiding stress points in bending of the finger 23, the wall 22 is slightly flared at its outer end adjacent the opening as indicated at 24 in FIG. 4. Thus the finger can bend away from the crop or away from contact with any other object and can flex back into its required position. A suitable plastics material is Delrin (Trademark) manufactured by Dupont.

The finger 23 carries a button 24 on one face for cooperation with the opening 24 in the wall 17. The button 25 is pressed through the opening 24 by the resilience of the finger 23 and by contact with the wall 22 of the pocket so as to retain the finger in its inserted position within the body of the bat. A slot 26 in the button 25 allows the finger to be removed by pressing the button inwardly using a screwdriver or similar tool.

The folding of the edge 19 over the wall 18 between the pockets 21 provides a substantially closed tubular shape for the bat member which gives it structural strength and resistance to twisting on application of torque at one end. The edge 19 can be spot welded to the surface 18 to complete the structural strength.

Figure 7:
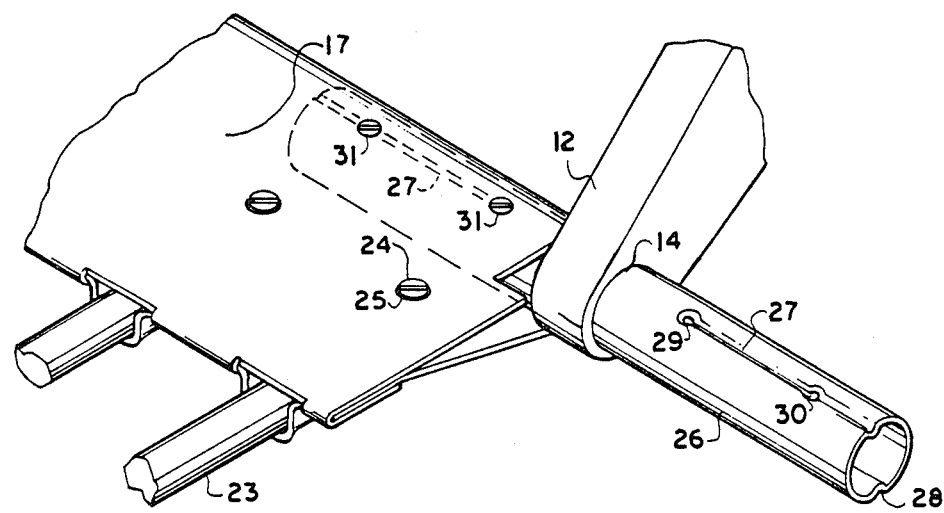
FIG. 7 is an isometric view of the bat and coupling member of FIGS. 4, 5 and 6 taken from a top view.

Each bat member is connected to the next adjacent bat member by a tube 26 which extends through the bearing 14 as a resistance fit to provide two separate tubes each for extending into respective one of two adjacent bat members as shown particularly in FIG. 7. The tube 26 is generally circular in cross section as thus shown in FIG. 4 and includes a pair of grooves part way along the length thereof and breaking out into the ends as indicated at 27, 28. In addition each of the grooves has in a base thereof a pair of punched holes 29, 30. The holes are arranged so that the holes 29 adjacent the inner end of the groove 27 align with the hole 29 in the inner end of the groove 28 so the bolt 31 can be passed through the holes for receiving a nut 32 on an exposed end at the opposed hole.

The innerface of the nut as indicated at 33 and the underside of the head of the bolt as indicated at 34 are both tapered or chamfered so as to fit into a countersunk or chamfered portion of the hole 29, 30. Such a shape can be obtained by punching the hole 29, 30 in the base of the groove so as to incline an innermost portion of the metal which is punched away from the surface of the groove and toward the opening defining the hole.

The thin metal of the bat member is then attached to the tube 26 by inserting the tube into the support portion 15 as a sliding fit with the tube matching the internal surface of the support portion. The support portion has a pair of holes drilled or punched for alignment with the holes 29 and 30 as indicated at 35 in FIG. 5. The bolt 31 is then inserted through the holes 35 and 29 and the nut 32 attached to the exposed end and tightened. This acts to distort the metal surrounding the hole 35 to depress it into the chamfered or countersunk hole 29 in the groove and beneath the groove in the wall of the tube 26. Thus a significant portion of the metal of the thin bat member is clamped into the holes 29 and 30 so that torque is transmitted through that metal into the bat member and avoids tearing or twisting of the metal at the connection.

If it is required to remove a particular bat member from the complete bat due to local damage, it is possible to remove the bolt and nut and to withdraw the bat member from the tube 26 by sliding the distorted metal around the hole 35 along the groove 27, 28 until the tube 26 is fully withdrawn from the bat member.

Figure 2:
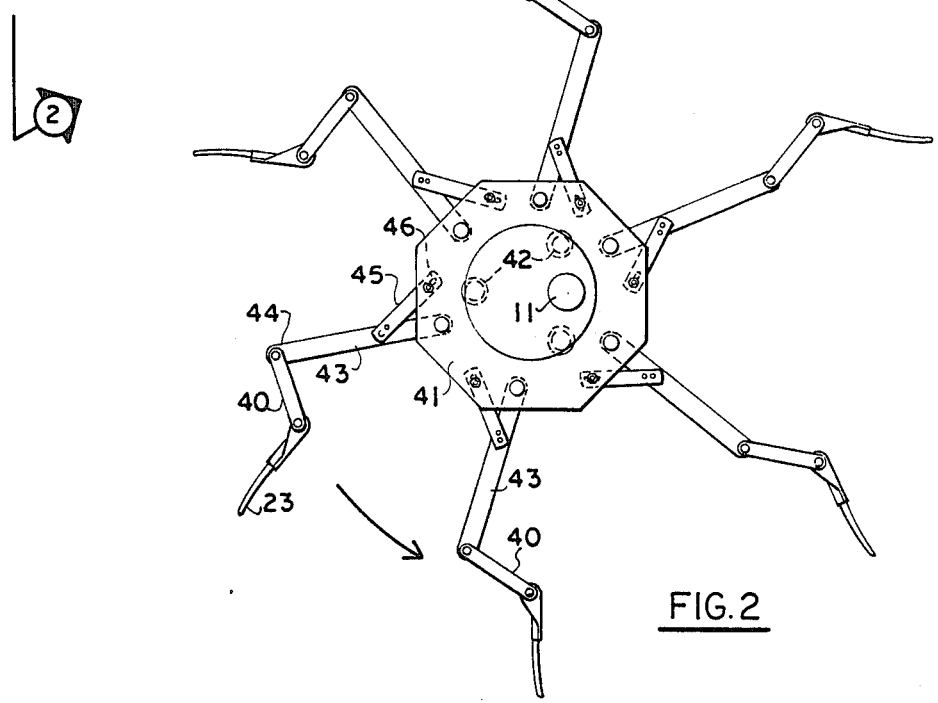
FIG. 2 is a cross sectional view taken along the lines 2—2 of FIG. 1.
Figure 3:
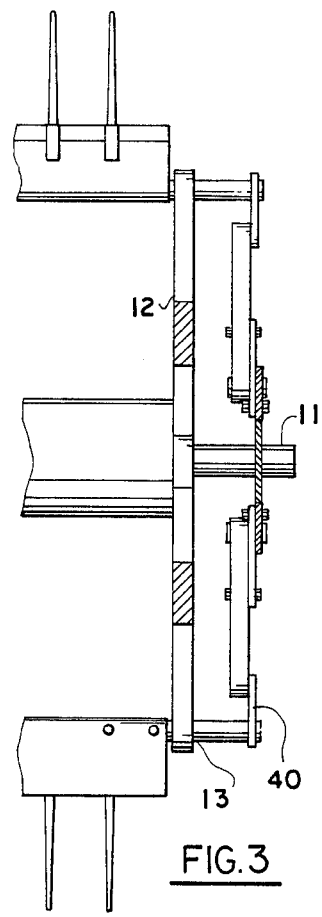
FIG. 3 is a partial cross sectional view taken on a vertical plane passing through the shaft of the reel of FIG. 1.
Figure 5:
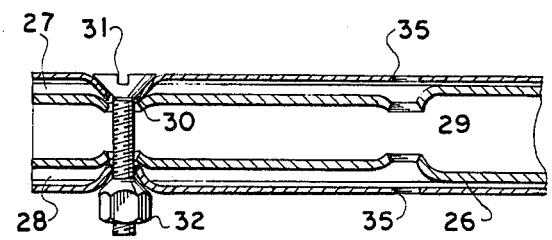
FIG. 5 is a cross sectional view taken along the lines 5—5 of FIG. 4.

The bearings 13 and the tubes 26 thus define a pivot axis for the bat. Actuation of the pivoting movement is obtained by a crank 40 attached to an exposed end of the tube at one end of the reel. The cranks 40 of the bats are actuated by the mechanism shown most clearly in FIGS. 2 and 3. Specifically a ring member 41 is mounted eccentrically for rotation around the shaft 11 on rollers 42 which are mounted on a plate attached to the reel arms. As shown in FIG. 2 the ring member 41 is offset forwardly relative to the shaft 11 so that the maximum displacement occurs substantially at the 9:00 o'clock position and the minimum displacement at the 3:00 o'clock position. The ring member 41 is pivotally attached to a plurality of link members 43 which extend generally outwardly therefrom for attachment via a bearing member 44 to the crank 40. The bearing member 44 provides pivotal connection between the link member 43 and the crank 40 and in addition a suitable bearing coupling is provided betweent the link member 43 and the ring member 41. The crank 40 normally trails the respective bat axis with the link member 43 extending forwardly from that trailing position inwardly to the coupling with the ring member so the coupling with the ring member is generally angularly advanced relative to the position of the bat axis. Thus the sum of the length of a link member 43 and its distance from the cam axis of the ring 41 is greater than the direct radial distance between the ring member and the bat pivot axis. This improves the finger action by increasing the dwell period at the 90 degree retarded position of the fingers to improve the withdrawal action from the crop.

Each link member 43 is also coupled to the ring member 41 by a sliding link 45 which is connected to the link member 43 part way there along and is pivotally connected to the ring member at a position trailing the link member. The link 45 has a slot 46 slidable on the pivot coupling to the ring member so as to accommodate movement of the ring member 43 relative to the ring member 41.

The extent of the slot 46 is designed so as to limit the extremes of movement required of the bats about the bat axis. Thus the bat in the 8:00 o'clock position as shown in FIG. 2 is approximately at one extreme of the movement where the link member 43 is forced as far outwardly as possible so as to turn the crank 40 in an anti-clockwise direction relative to the bat axis so as to advance the fingers 23 of the bat relative to a radial plane by approximately 35 degrees. Rotation of the reel and the ring member then takes the bat through the positions as shown with the link member 43 gradually being withdrawn so as to rotate the bat in a clockwise direction to a fully retracted position at approximately the 2:00 o'clock position of the reel at which it is retarded by 90 degrees. Subsequently as the reel rotates the link member 43 gradually moves outwardly to rotate the bat in the anti-clockwise direction back to the extreme position.

Rotation of the shaft 11 and therefore the reel itself is obtained by any suitable drive mechanism for example a drive belt taken from a main drive or a hydraulic motor attached to a suitable coupling on the shaft itself. The ring member 41 is free to rotate relative to the shaft on the rollers 42 but is driven to rotate with the shaft by the link members 43 and the slide links 45. Thus it will be noted that as the bats rotate around the shaft 11, the link members 43 force the ring member 41 around.

The rigid sliding links 45 act to limit the movement of the bats so that as each bat in turn reaches an extreme position it acts to drive the ring member through the respective link member 43 and then acts merely to pivot on the ring member as the respective bat passes through intermediate positions. Thus it will be noted that the rigid link 45 at the 8:00 o'clock position is at the extreme end of its sliding movement causing the link member 43 at that position to push the link member around. The bat at the 3:00 o'clock position is approaching the opposite extreme end of the movement so that at the 2:00 o'clock position (not shown) the bat acts to pull the ring member via the rigid sliding link 45.

It will be appreciated that the sliding links 45 could be replaced by other mechanisms which act to allow pivotal movement between the link member 43 and the ring member 42 while limiting the extreme movements thereof. Such a mechanism could be provided by suitable stops on the ring member or by stops adjacent the bat.

The driving of the ring member 41 by each of the bats and respective link members 43 in turn provides a particularly effective motion of the ring member to obtain the desired position of each of the bats during the cycle.

Thus at the 8:00 o'clock position, the fingers are advanced through approximately 35° so as to enter the crop without damage in a substantially vertically direction. Subsequently as the reel rotates in an anti-clockwise direction and is moved towards the left by forward motion of the harvester machine, the fingers move in such a manner that they remain substantially stationary relative to the crop by gradually reducing the advance so that at the 6:00 o'clock position the fingers are substantially in the radial plane. The fingers then are gradually retarded so as to slip out of the collected crop as it is deposited on the table until the maximum retarded position at the 2:00 o'clock position in which the fingers lie approximately at right angles to the radial plane.

The tear drop shape of the bat as previously explained also act to drop the cut crop onto the table without contacting it with sharp edges with a danger of snagging or damaging the crop.

The pivotal movement of the bats relative to the reel which takes place back and forth between the extreme positions as previously described avoids any wrapping of the crop around the bats so that the reel as far as possible remains free from collected crop thus avoiding necessity for halting operations to remove the crop and any crop losses.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A bat for a reel of a harvesting machine comprising a bat member formed from a sheet material to define a hollow elongate body having along one elongate side a leading edge and along an opposing elongate side a trailing edge, said leading edge defining a substantially sharp edge and said trailing edge being of increased transverse dimension relative thereto such that said body converges from said trailing edge to said sharp leading edge, said sheet material at said sharp front edge being formed by a first and a second overlying sheet edges of said sheet material with said sheet material being continuous from said first sheet edge through said trailing edge to said second sheet edge, said first edge only of said first and second sheet edges, being deformed to provide a plurality of longitudinally spaced pockets each upstanding from a flat portion thereof with said pockets facing forwardly from the leading edge, each pocket having therein a finger molded from a plastics material extending into the hollow interior and projecting forwardly therefrom, in between each opening and the next, the first and second side edges lying in contact with one of said sheet edges being wrapped over the other sheet edge between said pockets so as to structurally unite said first and second sheet edges and to provide structural strength therefor, said finger and body including cooperating latch means for retaining said finger therein.

2. A bat for a reel of a harvesting machine comprising a bat member formed from a folded sheet to define a hollow elongate body having along one elongate side a leading edge and along an opposing elongate side a trailing edge, said leading edge being shaped to define a plurality of separate openings facing forwardly from the leading edge, each opening having therein a plastics finger extending into the hollow interior and projecting forwardly therefrom, in between each opening and the next, the body being closed to provide structural strength therefor, said finger and body including cooperating latch means for retaining said finger therein, wherein the hollow elongate body is formed at the leading edge by a top sheet edge and a bottom sheet edge, the top sheet edge having formed therein a plurality of pockets upstanding from a flat edge portion thereof, a forward end of each of the pockets defining a respective one of said openings, the bottom sheet edge being wrapped over the flat edge portion of the top sheet edge between said pockets so as to structurally unite said top sheet edge and said bottom sheet edge.

3. The invention according to claim 2 wherein said leading edge converges to a sharp edge between said fingers.

4. The invention according to claim 2 including a support portion of the bat member defined by the hollow elongate body at the trailing edge, said support portion being of increased transverse dimension such that the hollow body converges toward the leading edge.

5. The invention according to claim 2 wherein each pocket has an upper side thereof defined by said top sheet edge, said upper side being flared toward the opening so as to avoid sharp bend points of the plastics finger.

6. The invention according to claim 2 wherein the latch means comprises a button on the finger projecting therefrom in a lateral direction so as to extend through an opening on said bat member at right angles to the opening in the leading edge.

7. A bat for a reel of a harvesting machine comprising a plurality of bat members each being elongate and formed from folded sheet metal material to define in cross section a support portion of semi-circular cross section and a portion extending outwardly to one side thereof, and a plurality of connecting members each arranged to connect a bat member to the next adjacent bat member, each said connecting member including a cylindrical elongate body extending into the interior of the support portion partly upon the length thereof, said body having an outer wall defining a circular cross section such that it is a sliding fit in the support portion with a portion of the exterior of the body wall in contact with the interior of the support portion, said sheet metal material being thinner and more deformable than said elongate body wall, the outer wall having opposed countersunk holes therein one of which receives a tapered surface of a head of a screw threaded fastener passing radially through opposed holes in said support portion and through the holes in the wall of the body and the other of which receives a tapered surface of a nut screwed onto said bolt so as to force portions of the support member surrounding each of the holes into the holes in the wall of the body to clamp the support portion to the body, and two grooves each extending along said body longitudinally thereof from a respective one of the holes to an end of the body.

8. The invention according to claim 7 wherein the outwardly extending portion extends away from said body and converges to an edge spaced from said body.

9. The invention according to claim 7 wherein said bat member is formed from a single sheet of sheet metal material folded and welded at an edge spaced from said support portion.

10. The invention according to claim 7 wherein the groove has two holes therein spaced longitudinally thereof each for cooperation with a respective screw threaded fastener and a respective hole in said support member.

11. An interconnection for communication torque from a connecting member to an elongate tubular sheet metal member, said sheet metal member defining in cross section a support portion of semi-circular cross section and a portion extending outwardly to one side thereof, and a plurality of connecting members each arranged to connect a bat member to the next adjacent bat member, each said connecting member including a cylindrical elongate body extending into the interior of the support portion partly upon the length thereof, said body having an outer wall defining a circular cross section such that it is a sliding fit in the support portion with a portion of the exterior of the body wall in contact with the interior of the support portion, said sheet metal material being thinner and more deformable than said elongate body wall, the outer wall having opposed countersunk holes therein one of which receives a tapered surface of a head of a screw threaded fastener passing radially through opposed holes in said support portion and through the holes in the wall of the body and the other of which receives a tapered surface of a nut screwed onto said bolt so as to force portions of the support member surrounding each of the holes into the holes in the wall of the body to clamp the support portion to the body, and two grooves each extending along said body longitudinally thereof from a respective one of the holes to an end of the body.

12. The invention according to claim 11 wherein the wall has at least one groove therealong in which said countersunk hole is positioned.

13. A bar for a reel of a harvesting machine comprising a plurality of bat members each being elongate and formed from folded sheet metal material to define in cross section a support portion of semi-circular cross section and a portion extending outwardly to one side thereof, and a plurality of connecting members each arranged to connect a bat member to the next adjacent bat member, each said connecting member including a cylindrical elongate body extending into the interior of the support portion partly upon the length thereof, said body having an outer wall defining a circular cross section such that it is a sliding fit in the support portion with a portion of the exterior of the body wall in contact with the interior of the support portion, said sheet metal material being thinner and more deformable than said elongate body wall, the outer wall having opposed countersunk holes therein one of which receives a tapered surface of a head of a screw threaded fastener passing radially through opposed holes in said support portion and through the holes in the wall of the body and the other of which receives a tapered surface of a nut screwed onto said bolt so as to force portions of the support member surrounding each of the holes into the holes in the wall of the body to clamp the support portion to the body, and two grooves each extending along said body longitudinally thereof from a respective one of the holes to an end of the body, said semi-circular bolt support portion being deformed only into said holes so as to be spaced outwardly of the grooves and said grooves having a depth of less than the depth of the holes.

* * * * *